US006473103B1

(12) United States Patent
Bailey et al.

(10) Patent No.: US 6,473,103 B1

(45) Date of Patent: Oct. 29, 2002

(54) CONVEYING URGENCY VIA A CONTROL

(75) Inventors: Nicholas Raymond Bailey, Southampton; Richard John Gadd, Eastleigh; Robert Harris, Christchurch, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/368,289

(22) Filed: Aug. 4, 1999

(30) Foreign Application Priority Data

Aug. 18, 1998 (GB) ............................................ 9817862

(51) Int. Cl.[7] ................................................ G06F 3/14

(52) U.S. Cl. ....................... 345/794; 345/781; 345/764; 345/788; 345/800

(58) Field of Search ................................ 345/418, 765, 345/778, 764, 788, 800, 589, 781, 794, 768

(56) References Cited

U.S. PATENT DOCUMENTS

| | | | | | |
|---|---|---|---|---|---|
| 5,062,060 | A | * | 10/1991 | Kolnick | 395/339 |
| 5,576,946 | A | * | 11/1996 | Bender et al. | 364/146 |
| 5,751,965 | A | * | 5/1998 | Mayo et al. | 709/224 |
| 5,751,979 | A | * | 5/1998 | McCrory | 345/343 |
| 6,222,542 | B1 | * | 4/2001 | Poreh et al. | 345/346 |

* cited by examiner

*Primary Examiner*—Kristine Kincaid
*Assistant Examiner*—Thomas T. Nguyen
(74) *Attorney, Agent, or Firm*—Roy W. Truelson

(57) ABSTRACT

A desktop manager for a multi-processing graphic user interface operating system operates to control the display of a plurality of controls each occupying respective display areas on a desktop. An improved desktop manager characterised by means adapted to receive a request for urgency from a process owning a control; and means adapted to diminish the display of one or more of any other controls to draw the attention of a user to the control owned by the process requesting urgency is disclosed.

16 Claims, 2 Drawing Sheets

CONVEYING URGENCY VIA A CONTROL

FIELD OF THE INVENTION

The present invention relates to a desktop controller for an operating system adapted to convey a controls urgent need for attention and an interactive application cooperable with such an operating system.

BACKGROUND OF THE INVENTION

Operating systems including graphical user interfaces (GUI) are well known. In such operating system, for example, Windows 95/98/NT produced by Microsoft Corporation, OS/2 produced by IBM or UNIX—interaction with a user is via a desktop.

A desktop controller/manager is a component of the operating system. This holds whether or not a browser-like application is accessible through the desktop or a browser is providing the desktop as is possible in operating systems such as Windows 98.

Typically a desktop controller for a GUI displays windows, icons, pull-down menus and a mouse pointer. In GUI operating systems the term control is used for any such object, including for example a button, that enables user interaction or input, usually for initiating an action, displaying information, or setting values.

If a fire monitoring system process owning a desktop control, for example a window, wants to draw attention to itself, it usually has only its own portion of a display to convey the urgency. It does not effect the whole desktop. Prior art solutions designed to increase a user's responsiveness to a control requiring urgent attention in an interactive application employ jangling music or flashing displays etc. These operations, however, may not be available on hand-held monochromatic display devices or where the computer is without audio or tactile output.

DISCLOSURE OF THE INVENTION

Accordingly, the present invention provides a desktop manager for a multi-processing graphic user interface operating system operable to control the display of a plurality of controls each occupying respective display areas on a desktop, the desktop manager being characterised by means adapted to receive a request for urgency from a process owning a control; and means adapted to diminish the display of one or more of any other controls to draw the attention of a user to the control owned by the process requesting urgency.

In a further aspect there is provided an interactive application as claimed in claim 12 and a method as claimed in claim 16.

The present invention proposes that the control wanting attention requests the desktop manager—not itself—to vary and in particular diminish the display of other controls on the screen, thus drawing the user's attention to the control wanting attention. This variation of the display of the control relative to others signifies to the observer that the control wants some attention without relying on colour or sound effects.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
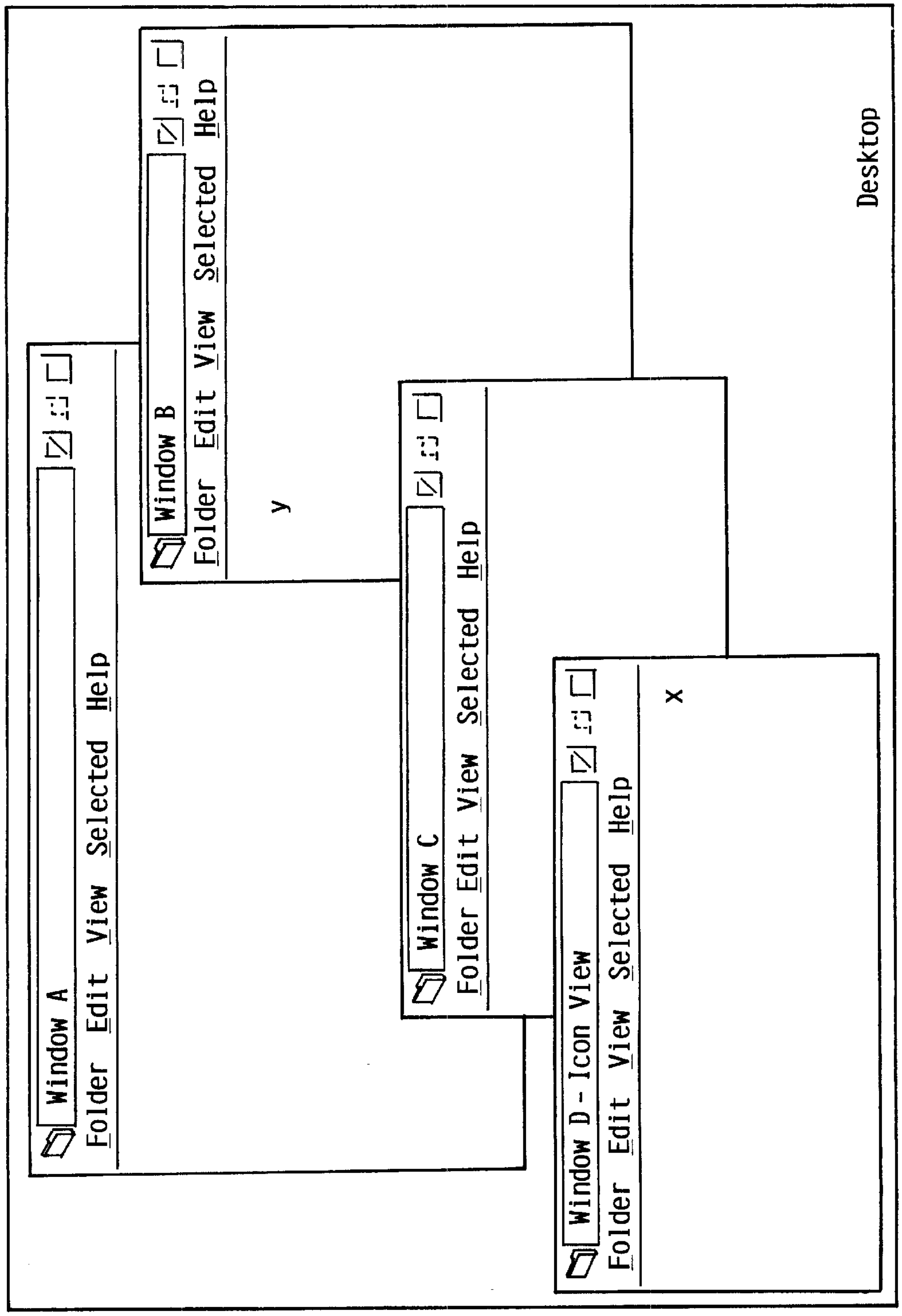
FIG. 1 is a view of a desktop containing a number of windows.

Referring now to FIG. 1, a control, Window A, is owned by an alarm generating process. On the current desktop are a plurality of other controls: windows B, C and D. When an alarm goes off, it is desirable to draw the attention of the operator to window A in a visual fashion.

The invention enables the process owning window A to effect the pixels comprising the display of windows B, C and D. Thus, these latter relatively unimportant controls fade whilst the one requesting action gets bolder in comparison. It is this action upon other controls by the control requiring urgent attention that is the key to this invention.

This description largely employs an implementation independent terminology, which is applicable to Microsoft Operating Systems, UNIX, OS/2 or Java APIs. For more information on developing applications for Microsoft Windows, in particular, see "Windows API Bible", James L. Conger, The Waite Group, 1992.

Programs—or more correctly, running processes request access to the desktop via a call to the desktop manager. This request returns a Window Handle which is then used by the process to draw on the screen.

The Window Handle itself is obtained by requesting the Desktop's Window to create another window within it. The Desktop Window Handle is obtained via an API call:

DesktopWinHandle=SystemGetDesktopwindowHandle( );

MywindowHandle=CreateWindow(DesktopWinHandle . . .) ;

The effect of this is two fold:

the Desktop creates a new Window Handle associated with a window to be contained within it; and the Desktop process knows about the MyWindowHandle it gave out and to whom it gave the handle.

The Window Handle is used by a process as a container to hold items to be displayed. Each operation (like draw a line, insert text, show an image, repaint the window) requested by the process is sent to the desktop manager along with the relevant Window Handle. (In Object Oriented terminology, the object representing the desktop manager is sent a message requesting action on the associated object representing the Window Handle.) The desktop manager then does the relevant action for the requesting process.

If a third-party process wants to request a Window Handle owning process to alter its window, it sends a message to the owning process Message Dispatching loop the Window Handle is not accessed directly.

When a window for a process is activated, associated information is held by the desktop manager process, for example, visibility, position or modality. (When a modal dialog box is on the screen, the user cannot switch to another part of the program and also access is limited to other visible windows of the program that called the dialog box.) This information, in combination with information for all the other Window Handles, is then used to control the picture presented upon the display device (the screen).

The crucial thing to note is that it is the desktop manager that controls the display of the windows residing therein—these latter windows request a display, but it is the desktop manager that decides what portion of windows are to be shown. This is the reason why Windows can overlay each other without (in certain programming modes) the owning processes noticing.

The desktop manager is assumed to obey the commands of the process holding a Window Handle. Thus, if the owning process says paint a line Red from here to there, the desktop manager will paint a red line according to the requested co-ordinates (allowing for things like scaling and window dimensions/attributes). It will not draw a Blue line, nor turn a straight line into a curve, nor substitute dots for a continuous segment.

Some actions the desktop manager takes are notified to the owning process: things like window movement notifications are sent to the owning process—which does not have to take any notice of them. In general, the owning process assumes the desktop manager has not altered the display in its window without telling the owning process.

The preferred embodiment provides a set of operations which perform Window alteration without notification to a Window's owning process. Preventing notification should be done if a process wants to increase its relative visibility on the desktop without prompting or relying on other processes to re-paint themselves in response to the changes the desktop manager makes to their display.

The present embodiment provides a desktop controller including an API of the form:

RequestDesktopUrgency(DesktopWindowHandle, MyWindowHandle, Urgency)

where DesktopWindowHandle is the Window Handle of the Desktop (as defined above); MywindowHandle is the Window Handle of the Window whose relative visibility is to be altered (as defined above); and Urgency is an integer setting the degree of urgency, Urgency can have the following ranges of values:

<0->decrease visibility

0->reset visibility

<0->increase relative visibility

Providing the Urgency parameter allows for more than one request for urgency to be active, enabling the desktop manager to either decide to process all of them or decide which one is to take priority on the basis of Urgency or just process the latest request.

In a preferred embodiment, the relative increase in visibility is implemented by getting the desktop manager to remove pixels (depixelate) from all the other windows, so making the process requesting urgency more obvious to the user.

In a Microsoft Windows type embodiment, the invention can take advantage of the WM_SAVEBITS window property. If a process switches on this property, every time it re-paints its window, a copy of the re-painted image is saved by the desktop controller. Thus, if a window changes order with other controls on the desktop, the desktop controller does not need to ask the owning process to re-paint its window, rather it uses the bitmap it has stored in memory.

Figure 2:
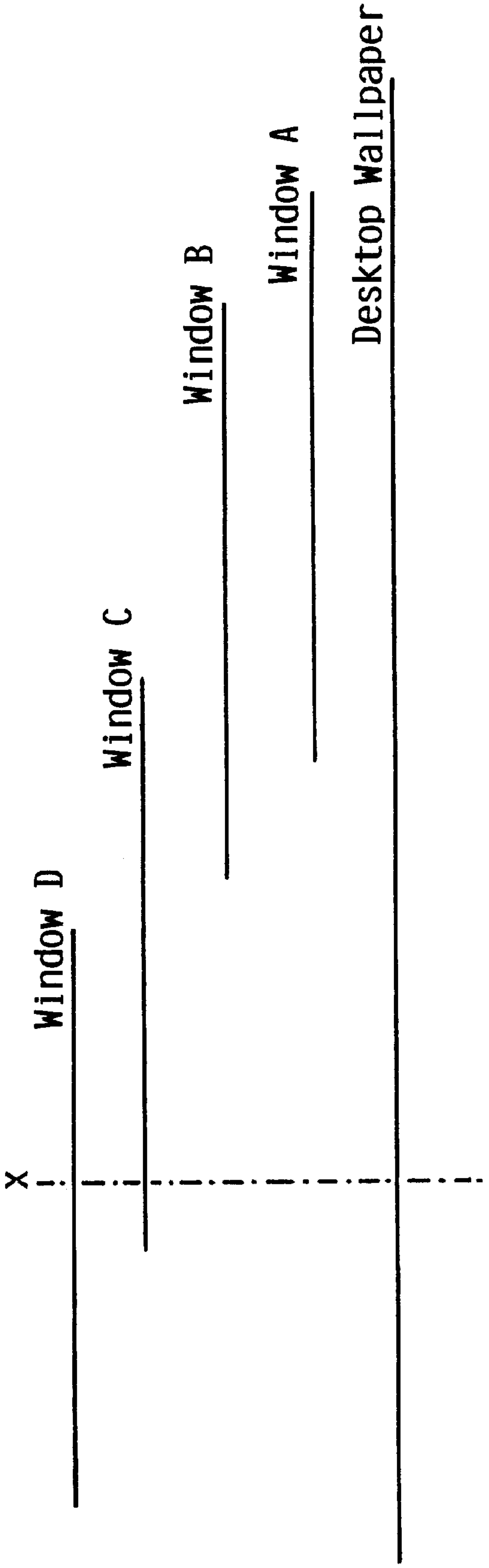
FIG. 2 is a view showing the z-order of controls on a portion of the desktop of FIG. 1.

The desktop controller also knows the z-order of the saved window bitmaps in memory, as represented in FIG. 2. Thus, the controller knows that the background for point x in Window D, is the foreground for the same location in Window C. Similarly, the background for point x in Window C is the desktop wallpaper colour for this location. Thus, in the preferred embodiment a desktop controller is adapted to depixelate controls on the desktop by iterating through locations in saved control bitmaps to be depixelated from the bottom (desktop wallpaper) of the z-order to the top and setting the colour for each location to be depixelated to the colour of the control beneath it in the z-order.

It will be seen that this method of depixelation will cause upper windows in the z-order to diminish more slowly to the desktop wallpaper than lower windows. Thus, in a variation the desktop controller is adapted to set selected locations to either the foreground of one any controls requesting urgency or the desktop wallpaper whichever is higher in the z-order.

Thus, when a RequestDesktopUrgency message is received by the desktop manager from the process owning window A, it proceeds to delete pixels from all the other controls, in the case of FIG. 1 windows B, C and D. This means that pixels in the effected controls are set to the background colour of the control, that is the colour of the control underneath in the z-order.

It should be noted, however, that as window A is associated with the process requiring urgency, the background for the point y in window B, remains the foreground colour of the same location in window A, because window A, the window requesting urgency, is not being depixelated.

So, by iteratively setting the colour for each pixel to its background colour for each affected control on the desktop, these pixels will take the colour of the desktop wallpaper, thus causing these controls to disappear and highlight the control for the process requiring urgency.

Using this technique, the processes owning these effected controls are not told that their picture has been corrupted. This pixel deletion continues until the control which is being made relatively more important is selected.

If more than one request for urgency is received at any given time, one option available to the controller is not to delete pixels from any urgent windows. Alternatively, the rate of depixelation can be varied so that none takes place on the most urgent window, some on less urgent windows and most on non-urgency requesting windows.

Once the urgent request has been satisfied, for example by selecting the requesting window, the desktop can be restored by the desktop requesting each owning process to re-paint, which in turn causes the saved bitmaps to be re-freshed.

The desktop manager also needs to keep track of the level of depixelation for effected controls so that, if these windows are altered (or repainted), for example by moving the window or by its owning process updating the window contents, the desktop manager can return these windows to their previous state of depixelation. Thus, if an affected window is moved, the desktop manager can begin by requesting a window to re-paint, thus re-freshing the saved bitmap, and immediately depixelating the saved window to the stored level, to maintain the relative unimportance of these effected windows. The desktop manager then iteratively continues to depixelate the saved bitmaps as before.

When the Window which is requesting relative Urgency is selected (by Mouse or Keyboard or Voice etc.), the desktop manager cancels the Urgency request and restores all depixelated windows to their correct displays. Thus, the desktop manager alters the relative importance of Windows by pixel stealing.

In order for the first embodiment to work, applications either need to be forced to turn the WM_SAVEBITS window property on, or the desktop needs to be adapted to cause all windows to turn this property on, as soon as it receives a first request for urgency. If saving memory is a high priority, owning processes can then be allowed to turn off the WM_SAVEBITS property when no urgency requests are active.

In an alternative embodiment, when the RequestDesktopUrgency message is received by the desktop manager, it proceeds to iteratively reduce the size of the other controls.

In the case of windows, the desktop manager needs to re-size window frames surrounding a window rather than effect the contents of the window client area as in the case of the first embodiment.

It should be noted, however, that while the first embodiment should work with most controls, some controls do not lend themselves to being re-sized freely. If in the second embodiment, the desktop manager issues successive commands requesting owning processes to set their size to ever smaller dimensions, some may refuse and thus the impact of a process, request for urgency may be lost. On the other hand if the desktop manager does not notify affected processes, rather sets their control size directly, this may cause some processes to crash.

Some operating systems are easily adapted to employ the second embodiment. In UNIX operating systems, it is possible for the desktop controller to cause a window to be re-sized without the owning process being notified. In Microsoft Windows operating systems, however, it is easier to adapt the desktop controller to implement the invention, simply by having it request process owning controls to re-size. If some processes refuse to re-size their controls, then the effect of the invention will be diminished.

In the alternative embodiment, simultaneous requests for urgency can be dealt with in an analogous manner to those of the first embodiment. If an Urgency parameter is used in the RequestDesktopUrgency API, the desktop manager can also decide to reduce the size of controls at a rate inversely proportional to their level of urgency. Thus, the most urgent control will not be reduced, while the least urgent control would be reduced at a rate only slightly slower than controls not requesting urgency. When the most urgent control is dealt with, the desktop manager then restores the size of the next most urgent control until all urgent requests are dealt with.

It will be seen that a user returning to use a computer where an application has issued a request for urgency may be surprised to see that only one desktop control remains on the desktop. This should be taken into account by applications and processes employing the invention, so that they advise the user accordingly.

The present description referred to a fire alarm. It will be seen, however, that the invention is applicable to any type of process which may want to request attention from a user. For example, if an e-mail program receives a message marked urgent as distinct from normal priority, it may want to notify the user, or if a computer is connected to a phone system, then it may want to advise a user that a voice mail message has arrived.

What is claimed is:

1. A desktop manager for a multi-processing graphic user interface operating system operable to control the display of a plurality of controls each occupying respective display areas on a desktop, each control of said plurality of controls having a respective z-order in a z-order relationship maintained by said desktop manager, the desktop manager being characterised by:

means adapted to receive a request for urgency from a process owning a control; and means adapted to diminish the display of one or more of any other controls while maintaining the same z-order relationship to draw the attention of a user to the control owned by the process requesting urgency.

2. A desktop manager as claimed in claim 1 wherein the desktop manager is responsive to an urgency request from a process owning a control to remove pixels from the other controls displayed on the desktop.

3. A desktop manager as claimed in claim 2 wherein processes owning controls are adapted to store bitmap copies of said controls, said desktop manager is adapted to remove selected pixels from the bitmap copies of the controls owned by one or more of other controls and to update the desktop display using said bitmap copies.

4. A desktop manager as claimed in claim 3 wherein said desktop manager is responsive to a first request for urgency to cause said processes to store said bitmap copies.

5. A desktop manager as claimed in claim 1 wherein the desktop manager is responsive to an urgency request from a process owning a control to diminish the display of the other controls displayed on the desktop by re-sizing the other controls.

6. A desktop manager as claimed in claim 5 wherein the desktop manager is adapted to request processes owning the other controls to re-size the other controls.

7. A desktop manager as claimed in claim 5 wherein the desktop manager is adapted to re-size the other controls without notifying the processes owning said other controls.

8. A desktop manager as claimed in claim 1 wherein said request for urgency includes a level of priority and said desktop manager is responsive to simultaneous requests for urgency to arbitrate between said requests according to their respective levels of priority.

9. A desktop manager as claimed in claim 8 wherein the level of priority is proportional to the urgency of the request.

10. A desktop manager as claimed in claim 9 wherein the desktop manager is responsive to said requests for urgency to diminish the display of controls at rate inversely proportional to the level of priority of any request for urgency from respective processes owning said controls.

11. A computer program product comprising computer readable code stored on a storage medium for, when executed on a computer, controlling the display of a plurality of controls each occupying respective display areas on a desktop, the product comprising a desktop manager as claimed in claim 1.

12. A desktop manager for a multi-processing graphic user interface operating system operable to control the display of a plurality of controls each occupying respective display areas on a desktop, the desktop manager being characterised by means adapted to receive a request for urgency from a process owning a control; and means adapted to diminish the display of one or more of any other controls to draw the attention of a user to the control owned by the process requesting urgency;

wherein the desktop manager is responsive to an urgency request from a process owning a control to remove pixels from the other controls displayed on the desktop;

wherein processes owning controls are adapted to store bitmap copies of said controls, said desktop manager is adapted to remove selected pixels from the bitmap copies of the controls owned by one or more of other controls and to update the desktop display using said bitmap copies; and wherein said desktop manager is adapted to store a z-order of said bitmap copies and is adapted to remove pixels from said bitmaps by iterating through locations in said bitmap copies of the other controls from a lowest bitmap in said z-order to a highest bitmap in said order and by setting the colour for each location to the colour of the control beneath it in the z-order.

13. In a desktop manager for a multi-processing graphic user interface operating system operable to control the display of a plurality of controls each occupying respective display areas on a desktop, each control of said plurality of controls having a respective z-order in a z-order relationship maintained by said desktop manager, a method of conveying urgency to a user comprising the steps of:

responsive to an interactive process owning a control issuing a request for urgency, receiving said request for urgency from said process; and diminishing the display of one or more of any other controls to draw the attention of a user to the control owned by the process requesting urgency while maintaining the same z-order relationship.

14. A method as claimed in claim 13, wherein said step of diminishing the display of one or more of any other controls comprises removing pixels from one or more other controls displayed on the desktop.

15. A method as claimed in claim 14, wherein removing pixels from one or more other controls displayed on the desktop comprises iterating through controls from a lowest control in said z-order to a highest control in said z-order and setting selective pixels in each respective control to the color of a control beneath it in the z-order.

16. A method as claimed in claim 13, wherein said step of diminishing the display of one or more of any other controls comprises reducing the size of the one or more other controls displayed on the desktop.

* * * * *